United States Patent
Palmer et al.

[11] Patent Number: 5,625,640
[45] Date of Patent: Apr. 29, 1997

[54] APPARATUS FOR AND METHOD OF BROADCAST SATELLITE NETWORK RETURN-LINK SIGNAL TRANSMISSION

[75] Inventors: Larry C. Palmer; Leonard S. Golding, both of Potomac, Md.

[73] Assignee: Hughes Electronics, Los Angeles, Calif.

[21] Appl. No.: 308,003

[22] Filed: Sep. 16, 1994

[51] Int. Cl.$^6$ ............................. H04B 1/713; H04B 7/19
[52] U.S. Cl. ..................... 375/202; 375/200; 370/316; 342/352
[58] Field of Search ........................... 375/200, 202, 375/206; 370/20, 32.1, 84, 104.1, 18; 342/352; 455/12.1

[56] References Cited

U.S. PATENT DOCUMENTS

| | | | |
|---|---|---|---|
| 3,605,018 | 9/1971 | Coviello | 375/200 |
| 4,532,635 | 7/1985 | Mangulis | 375/206 |
| 4,567,485 | 1/1986 | Oshima et al. | 342/352 |
| 4,630,283 | 12/1986 | Schiff | 375/205 |
| 4,688,216 | 8/1987 | Saburi | 370/104.1 |
| 4,979,170 | 12/1990 | Gilhousen et al. | 370/104.1 |
| 5,261,118 | 11/1993 | Vanderspool, II et al. | 455/12.1 |
| 5,404,375 | 4/1995 | Kroeger et al. | 375/200 |
| 5,410,750 | 4/1995 | Cantwell et al. | 455/306 |
| 5,414,431 | 5/1995 | McCoskey | 342/352 |

*Primary Examiner*—Young T. Tse
*Attorney, Agent, or Firm*—John T. Whelan; Wanda K. Denson-Low

[57] ABSTRACT

An apparatus and method for return-link transmission in direct broadcast satellite networks having a hub earth station transmitting forward-link signals, and a plurality of remote terminal stations receiving the forward-link signals and transmitting return-link spread-spectrum signals in the same transponder as the forward-link signal so that both are received at the hub station. The apparatus located at the hub station is comprised of a demodulator and a remodulator of the forward-link signals, delay as necessary for composite signals comprising the forward-link signals interfered with the return-link signals and received from a satellite, and a canceler subtracting the remodulated signals from the composite signals. The method includes a sequence of steps for synchronizing the return-link signals with the forward-link signals at the remote terminal stations, synchronizing the return-link signals with the forward-link signals at the satellite, receiving at the hub station from the satellite the composite signal having the forward-link signals interfered with the return-link signals, and canceling at the hub station the forward-link signals in the composite signals prior to spread-spectrum demodulation of the return-link signals.

15 Claims, 9 Drawing Sheets

APPARATUS FOR AND METHOD OF BROADCAST SATELLITE NETWORK RETURN-LINK SIGNAL TRANSMISSION

TECHNICAL FIELD

The present invention relates to satellite communications, and more particularly to satellite broadcast networks.

BACKGROUND OF THE INVENTION

In recent years, a special type of satellite system has been widely used which involves direct communications between satellites and small, low-cost terminal stations, sometimes referred to as VSAT's (very-small-aperture terminals). These VSAT ground stations operate with antenna apertures of about 1 meter or less.

The proper choice of an accessing format to accommodate a complete network of VSATs over a particular satellite bandwidth requires careful selection and design of transmitters, satellite, and receivers. To attain this goal and, in particular, to directly carry information to and from a home base via synchronous orbit satellites, a concept of a VSAT network using a common hub station designed to be a large earth terminal has been proposed. Techniques used for telecommunications of this type are commonly referred to as direct broadcasting by satellite (DBS).

Generally, an up-link forward transmitting hub station in DBS is used for broadcasting data, video, or voice in either digital or analog form to many VSATs. Techniques for return-link transmission from VSATs back to the hub station either use a separate return link transponder or share the transponder with the forward-link transmission. When the forward broadcast link fills the transponder, sharing by return links requires these links to use what is called spread spectrum (SS) techniques where the average energy of the return-link transmitted signal is spread over a bandwidth which is much wider than the information bandwidth. Using SS transmission in the same transponder as the forward link conserves space segment resources. However, transmitted power levels must be very low in order to minimize interference to the forward link, and as a result, SS techniques results in very limited capacity of each link, so information bit rates on the return links tend to be low (about 100 bit/sec).

In view of the foregoing, it is apparent that there is a need for an improved technique for same-transponder return-link signal transmission in DBS networks.

SUMMARY OF THE INVENTION

The present invention involves a method and apparatus for transmitting signals in return links of DBS networks of the type having at least one large hub earth station and a plurality of small receiving earth stations (VSATs). The hub station transmits up-link forward signals at frequency $f_u$ to the VSATs through the satellite transponder. The VSAT transmits return-link signals back to the satellite. The return-link capability is provided in the same satellite transponder by having the VSATs transmit SS signals to the satellite at the up-link frequency $f_u$. At the hub station, the return-link signals are received in addition to the station's own up-link signal and thermal noise. An accurate replica of the received forward-link signal is generated by synchronizing to and demodulating the hub station's own up-link signal, recovering the relatively noise-free modulation, and remodulating a signal at the received carrier frequency. This remodulated signal is then subtracted from a delayed version of the signal received from the satellite. Thus, by using large-signal cancellation at the up-link hub station, interference from the forward-link signal is reduced thereby allowing the return-link spread spectrum (SS) transmissions to operate at a much higher information bit rate than would be possible otherwise, without decreasing the number of users (VSATs) that generate return-link transmissions. Implementation of the method is accomplished using analog or digital techniques.

The foregoing features and benefits, together with additional features and benefits will become more apparent from the ensuing description and drawings which describe the invention in detail.

DETAILED DESCRIPTION OF THE PREFERRED EMBODIMENT

Figure 1:
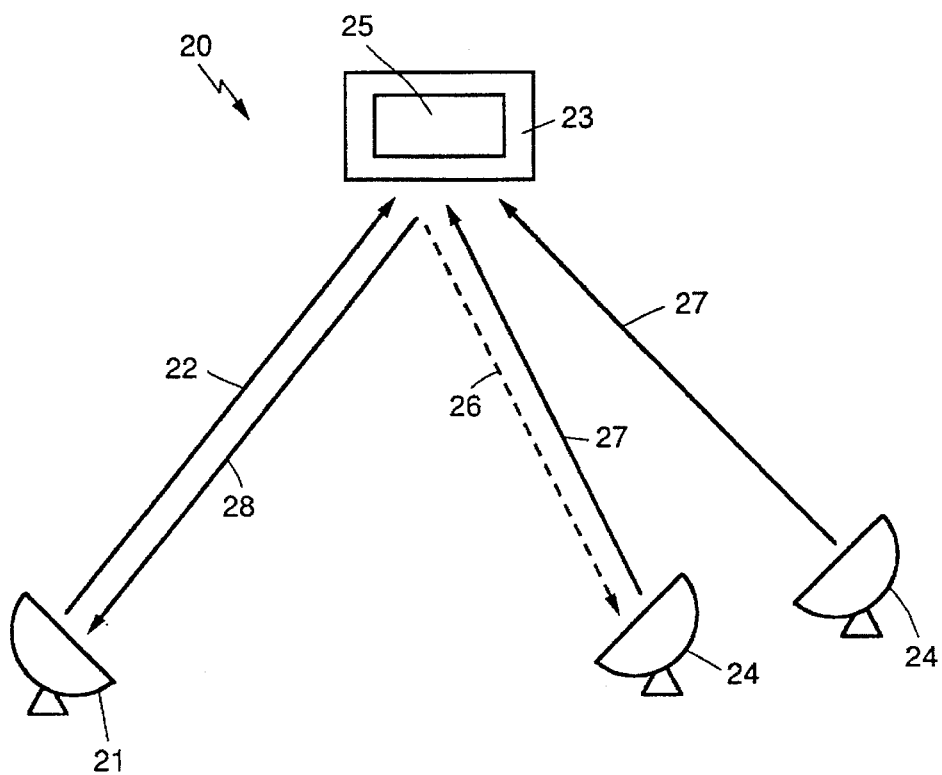
FIG. 1 is a diagrammatic view showing the transmission of signals transmitted between a hub station and several VSATs.
Figure 2A:
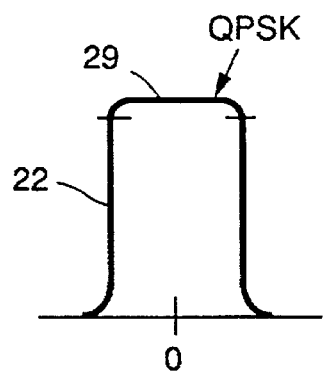
FIGS. 2a–2e are graphical representations of signals transmitted by the elements in FIG. 1.
Figure 2B:
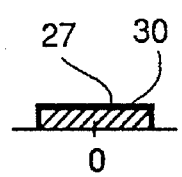

Referring now to the drawings, wherein like numerals designate like and corresponding blocks and signals throughout the drawings, a satellite broadcast network 20 is shown in FIG. 1 which comprises a large up-link hub earth station 21 for broadcasting a forward-link signal 22 through a satellite 23 to a plurality of remote terminal earth stations (VSATs) 24. This signal 22 is diagrammatically shown in FIG. 2a and is referred to as a QPSK (for Quadrature Phase Shift Keyed) signal. Satellite 23 has a transponder 25 through which forward-link signals 22 are transmitted. The broadcast signal 22 from hub station 21 is received at VSATs 24 as a down-link signal 26. Return-link transmissions 27 (shoe in FIG. 2b) from VSATs 24 back to the hub station 21 take place in the same transponder 25. At the hub station 21, the return-link signals 27 are received as a part of the signals 28, in addition to the station's 21 own up-link (forward-link) signals 22 and thermal noise. Signals 28 may thus be thought of as composite signals in that they contain both forward-link signals 22 and return-link signals 27.

To aid in understanding the substance of the invention, its environment is illustrated more specifically by an example using a detailed link budget set forth in Table 1. A DBS transmission network comprises the large, e.g. 10-meter, uplink station 21 and small home terminal transmitter at the VSATs 24 sharing one of the 24-MHz transponders 25. The home terminal 24 uses the same 18-inch antenna that is used for reception. It is assumed that a 0.5-watt transmitter is used at 17.5 GHz. This transmitted power (shown diagrammatically in FIG. 2a) constrains return-link capacity if it is assumed that antenna size cannot be increased. Larger transmitted power levels would result in a higher cost of the transmitter add-on to the home terminal 24.

TABLE 1

DBS Transmission: Forward Link and Return Link in Same Transponder

| | From Uplink Station | From Home Terminal |
|---|---|---|
| Up @ 17.5 GHz | | |
| Transmit Station EIRP (dBW) | 78.8 | 33.0 |
| Comments: Home; 18", 60% eff.; 0.5 W; Gain 36.2 dB | | |
| Uplink Path Loss (dB) | −208.9 | −208.9 |
| Atmospheric Loss (dB) | −0.3 | −0.3 |
| Uplink Rain Loss (dB) | 0.0 | −3.0 |
| Comments: Uplink station uses power control to compensate | | |
| Satellite G/T dB/K | +2.0 | +2.0 |
| Boltzmann's Constant, k dBW/HzK | 228.6 | 228.6 |
| Bandwidth, dB-Hz | −73.8 | −73.8 |
| Comments: (24 MHz) | | |
| Uplink C/N Thermal, dB | 26.4 | −22.4 (w/rain fade) −19.4 (no rain) |
| $(C/N_o)_{UP}$ | 100.2 | 51.4 (faded 3 dB) |

| | 30 Mbps to Uplink | Spread Spectrum to Uplink | 30 Mbps to Home Term. |
|---|---|---|---|
| Down @ 12.5 GHz to Uplink Station | | | |
| Satellite EIRP (dBW) | 49.0 | 49.0 | 49.0 |
| Backoff, one carrier | — | −48.8 | — |
| (faded) | | | |
| EIRP (dBW) | 49.0 | +0.2 | 49.0 |
| Downlink Path Loss (dB) | −205.9 | −205.9 | −205.9 |
| Atmospheric Loss (dB) | −0.1 | −0.1 | −0.1 |
| Downlink Rain Loss (dB) | −1.2 | −1.2 | −1.2 |
| Rain Temp. Increase (dB) | −1.8 | −1.8 | −1.8 |
| Pointing Loss (dB) | −0.3 | −0.3 | −0.3 |
| Ground G/T (dB/K) | 38.7 | 38.7 | +13.0 |
| Comments: Gain of 18" @ 12.5 33.6 dB; 10 m uplink | | | |

TABLE 1-continued

DBS Transmission: Forward Link and Return Link in Same Transponder

| | | | |
|---|---|---|---|
| station, 55%; G = 59.7; 1 dB N.F. $T_{sky} = 50K$ Boltzmann's | 228.6 | 228.6 | 228.6 |
| Constant, k | | | |
| $RCVD(C/N_o)_{DN}$ | 107.0 | 58.2 | 81.3 |
| Signal Power Received (dBW) | | −147.6 | −124.9 |
| Interference Power Received | −98.8 | | |
| $C/(I/B) = C/I_o$ | | 24.2 | |
| Comments: Assumes interference spread over B = 20 MHz | | | |
| Composite $\frac{C}{N_{OU} + N_{OD} + I_O}$ dB − Hz | | 24.2 | |
| Min Required $E_b/N_b$ (dB) | | 4.2 | |
| Comments: (Assumed for $10^{-5}$ BER) | | | |
| Maximum bit rate $R_b$ (dB) | | 20.0 | |
| Maximum bit rate bps | | 100 | |

Figure 2C:
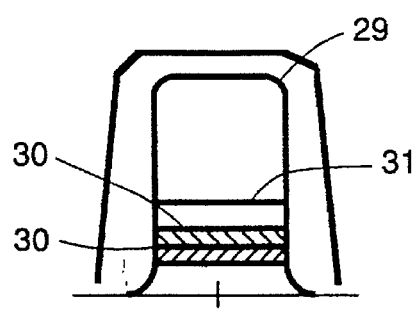

With a 0.5-watt transmitter at the home terminal 24, the single return-link transmission 27 (shown in FIG. 2b) arrives at the input to the transponder 25 48.8 dB below the 30-Mbps forward-link signal 22. Assuming linear sharing, the single spread-spectrum signal 27 is backed off by this amount and receives only this small fraction of the total effective isotropic radiated power (EIRP). Signals at the transponder 25 are diagrammatically depicted in FIG. 2c. Note that the spread-spectrum signal 27 is 20 dB below the thermal noise level at the input to the transponder 25 whereas the forward-link 30-Mbps signal 22 is 26.4 dB above the noise in the transponder 25.

For the conditions that exist with a single spread-spectrum signal 27, performance is determined completely by the ability of the demodulator at the receiving side to recover and demodulate the signal in the presence of the very large interfering signal, which is almost 50 dB larger in power level than the return-link signal. The 30-Mbps forward-link signal is already spread over the 24-MHz transponder bandwidth so that the ratio of spread-spectrum carrier power $C_{ss}$, to interference density, $I_c$, is $$\frac{C_{ss}}{I_c} = \frac{SS \text{ Signal Power}}{\text{Fwd. Link Signal Power}} \text{ Transponder B.W.}$$

From Table 1, this ratio is 24.2 dB. Assuming modulation/coding such that $E_b/N_o = 4.2$ dB at threshold, the maximum data rate that can be supported on the return link is approximately 100 bps. Performance is totally limited by the large interfering carrier. Note, that $(C/N_o)_{Up}$ is over 50 dB-Hz, which could support tens of kbps without the interference; doElink $C/N_o$ is even higher. Note also that the low data rates and the phase noise expected for the Ku-band links will make coherent operation impossible. Thus, this value might require 32-ary FSK which gives $P_b = 10^{-5}$ at $E_b/N_o = 7.5$ dB combined with K=9, R=⅓ convolutional encoding and Viterbi decoding. With 6 dB of coding gain and 2 dB of implementation margin, this combination should allow operation at $E_b/N_o = 7.5 − 6 + 2 − 3.5$ dB.

Given that a spread-spectrum receiver can be implemented that operates with interference/signal ratios of almost 50 dB, a remaining question is how many of these spread-spectrum signals can simultaneously occupy the transponder. Again from Table 1, the forward-link DBS signal operates with $(C/N_o)_{UP}$ of 100.2 dB-Hz and downlink $(C/N_o)_{DN}$ into an 18-inch terminal (VSAT 24) of 81.3 dB-Hz. Performance is thus limited by the thermal noise in the home receiver. Performance is very sensitive to losses on this doElink and a reasonable criterion might be that the presence of N spread-spectrum signals should not degrade the DBS forward link by more than 0.1 dB. This means that the presence of N spread-spectrum signals should not reduce $(C/N_o)_{DN}$=81.3 to a value lower than 81.2. Therefore the ratio of carrier power, $C_{DBS}$, to spread-spectrum signal density must be at least 97.6 dB-Hz. For a bandwidth of 24 MHz, this means that the ratio of forward-link power received, $C_{DBS}$, to total spread-spectrum signal power, $NC_{SS}$, must be $$\frac{C_{DBS}}{NC_{ss}} \geq 23.8 \text{ db}$$

A single unfaded spread-spectrum signal is 45.8 dB below the forward-link signal so that N (in dB) can be ≦45.8–23.8 (dB)=22 dB or 158. Thus, as many as 158 simultaneous return-link channels could occupy one of the forward-link transponders 25. These noise-like signals would increase $(C/N_o)_{DN}$ into the 18-inch home terminal at VSAT 24 by only a small amount degrading rain-faded performance by 0.1 dB.

Judging how useful such a capacity might be, given that 158 100-bps links can be provided in a forward-link transponder, it should be first taken into account that if poll-response operation is used so that individual home receivers are polled via a data channel in the forward link (where there is much more capacity), receivers could respond when polled via the return link. If responses contain 50 bytes (400 bits), each response would take 4 seconds. With 2×10⁶ home terminals assuming 50% utilization of the channels, all could be polled and all responses received in a time $$T = \frac{400 \text{ bits/response}}{100 \text{ bits/second/chan}} \times \frac{2 \times 10^6 \text{ response}}{0.5} \times$$

$$\frac{1}{158 \text{ channels}} = 10^5 \text{ seconds} = 28 \text{ hrs}$$

Thus, in approximately one day, all remote terminals (VSATs) can be polled and a 400-bit response received. Alternatively, if the return link were only used during off-hours, say 2 hours per day, then all remote terminals could be contacted in about 2 weeks. Such a mode provides a method whereby the uplink site can contact all home terminals and receive a response from each.

Another way of judging capacity is to assume that the VSATs want to initiate data transmission sessions equivalent, for example, to 5-second connect times with a 1200-bps data link. This is equivalent to 60 seconds with the 100-bps link so each session is assumed to last for 1 minute (1/60 hour). With 2×10⁶ users, if 1% of these users use the system during the busy hour, then the load is 20,000 sessions/hour or 20,000(1/60)=333 Erlangs. With 158 CDMA channels per transponder, two transponders would be needed to provide this type of capability. Some means might have to be provided to regulate accesses during peak hours although the SS access technique would tend to degrade gradually with load.

Although moderate capacity might be available using this approach, the large-signal-cancellation technique described in the following allows for significant increase in return-link capacity and more practical implementation of the spread-spectrum transmission links. The forward-link 20-Msps QPSK signal 22 is transmitted with Nyquist filtering from hub station 21 with power $P_F$ at an uplink frequency $f_u$ from K-band (17.5 GHz). This signal contains a time division multiplex (TDM) of audio, compressed video and data packets. The broadcast signal 22 from hub station 21 arrives at the satellite 23, fills one of the 24-MHz transponders and then is retransmitted to and received at 12.5 Ghz by 18-inch antenna at VSATs 24 as a down-link signal 26 with a relatively low signal-to-noise ratio S/N. So, if the DBS uplink station 21 transmits EIRP of 78.8 dBW to the satellite 23 at 17.5 GHz, this QPSK signal 22 is supposed to arrive at the satellite 23 with signal-to-noise ratio in 24 MHz of +26.4 dB. The 30-Mbps signal is then received as signal 26 at the VSAT 24 antenna with a rain-faded threshold $C/N_o$ of 81.3 dB-Hz. If this same signal were received back at the uplink station 21, its energy-to-noise level ratio, $C/N_o$ would be 25.7 dB, i.e. quite enough for having practically error-free reception of the transmitted binary elements, even though the normal forward-link reception in the case of digital transmission relies on powerful error-control coding to achieve an acceptably low bit error rate at VSATs 24 and to recover the information bits.

VSAT 24 transmits a low data rate return-link signal 27 back to the satellite 23 with an EIRP of 33.0 dBW. Sent at a very low power level as compared to the forward link, these signals do not degrade the forward link. This transmission arrives at the satellite 23 with a signal-to-noise ratio in 24 MHz of −19.4 dB, which decreases to −22.4 dB with 3 dB of loss due to rain. Return-link transmissions from VSATs 24 back to the hub station 21 take place in the same transponder 25 of the satellite 23 by having the VSATs 24 transmit SS signals (direct sequence pseudo noise (PN), or frequency hopping (FH), or combinations) 27 to satellite 23 at the up-link frequency $f_u$. The signals at the transponder 25, namely the forward-link QPSK signal 29, N spread-spectrum signals 30 from VSATs 24, and thermal noise 31 are diagrammatically shown in FIG. 2c. As will be discussed below, the invention allows the number of spread-spectrum users to be further increased. On the other hand, performance of the return links is limited by the large forward-link signal that, although spread over its bandwidth of 20 MHz, has a power level that is considerably higher than one return-link signal.

As the detailed link budget in Table 1 shows, the ratio of powers in the forward-link QPSK signal and one return-link spread-spectrum signal, $P_F/P_{SS}$, is +44.8 dB when the spread-spectrum signal experiences a 3-dB rain fade F, and 45.8 dB when there is no rain.

The desired forward-link signal is received with power PF at a ratio of carrier power to thermal noise density can $$\left(\frac{C}{N_o}\right)_T = \left(\left(\frac{C}{N_o}\right)_U^{-1} + \left(\frac{C}{N_o}\right)_D^{-1}\right)^{-1}$$

of 99.4 dB-Hz. The binary elements on the 20-Msps QPSK signal (40 Mbps) are thus received at an $E_b/N_o$=23.4 dB. Thus, thermal noise is relatively low and very reliable hard decisions can be made on the coded received symbols. The ratio $PF/NR = P_F/(B_T N_o)$ is 25.6 dB (where $N_R$ is a received noise level at the uplink station 21, $N_o$ is effective one-sided noise spectrum level, W/Hz, and $B_T$ is the transponder 25 bandwidth of 24 MHz).

A single spread-spectrum signal received back at the uplink station 21 has an effective $$\left(\frac{C}{N_o}\right)_T = \left(\left(\frac{C}{N_o}\right)_U^{-1} + \left(\frac{C}{N_o}\right)_D^{-1}\right)^{-1}$$

of 46.7 dB when the signal is not faded by rain. However, the faded spread-spectrum signal is 48.8 dB below the forward-link signal so that the ratio $P_F/(FP_{ss})$ is 48.8 dB when the rain fade is 3 dB (i.e., F=0.5). Considering the forward-link signal as interference to the spread-spectrum signal, and assuming that the interference has a flat spectral density over the symbol rate bandwidth $R_s$20×10$^6$, then the ratio of spread-spectrum signal power to interference density is $$\frac{P_{ss}}{I_o} = \frac{FP_{ss}}{\left(\frac{P_F}{R_s}\right)} \quad (1)$$

Inserting the constants gives $P_{ss}/I_o$=24.2 dB-Hz. This value completely determines performance as compared to C/N$_o$ (thermal) of 46.7 dB-Hz. For a system that achieves some desired threshold BER (for bit error rate), at $E_b/N_o$=4.2 dB (where $E_b/N_o$ is a receiver bit energy-to-noise level ratio for digital systems), the link could support a data rate $R_b$=100 bps obtained as $$\frac{E_b}{N_o} = \frac{C}{(I_o R_b)} \; ; \; R_b = \frac{\frac{C}{I_o}}{\left(\frac{E_b}{N_o}\right)_{REQ}} \quad (2)$$

Figure 2D:
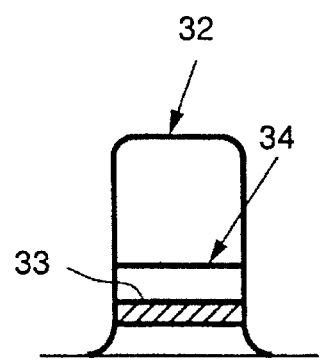

The hub station 21 receives its own QPSK signal as a part of composite signals 28 at a high signal-to-noise ratio (S/N) because of the larger terminal size, and also the SS signals that are below the thermal noise level in the receiver and still further below the spectral density level of the QPSK signal. The signal received at the station 21 and containing QPSK signal 32, N spread-spectrum signals 33 from VSATs 24, and thermal noise 34 is diagrammatically shown in FIG. 2d.

According to the invention, return-link transmitters of the VSATs 24 are made to operate synchronously with the forward link. It may be accomplished, if VSATs' PN chip rates are derived from the forward-link QPSK symbols received at VSATs 24. The return-link transmission is then made to be synchronous with the forward-link symbols at the satellite 23 and as such received back at the hub station 21. At the station 21, a receiver synchronizes to and demodulates the forward-link signal very reliably.

Figure 2E:
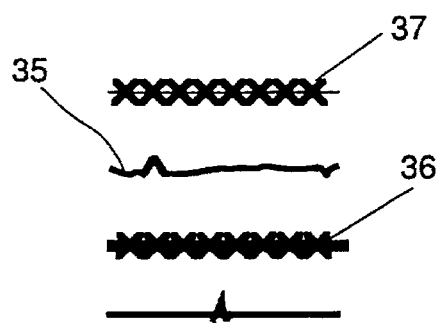

By synchronizing to and demodulating its own QPSK up-link signal, recovering the relatively noise-free modulation, and remodulating a signal at the received carrier frequency, an accurate replica is generated of the received forward-link signal. If this replica is subtracted from a delayed version of the received composite signal, it thus removes a fraction (1-β) of the forward-link signal leaving a fraction β$P_F$. FIG. 2e diagrammatically shows signals after cancellation, and they are power β$P_f$ residual (uncancelled) forward-link signal 35, spread-spectrum signals 36, and thermal noise (N$_o$)$_T$ 37.

Figure 3:
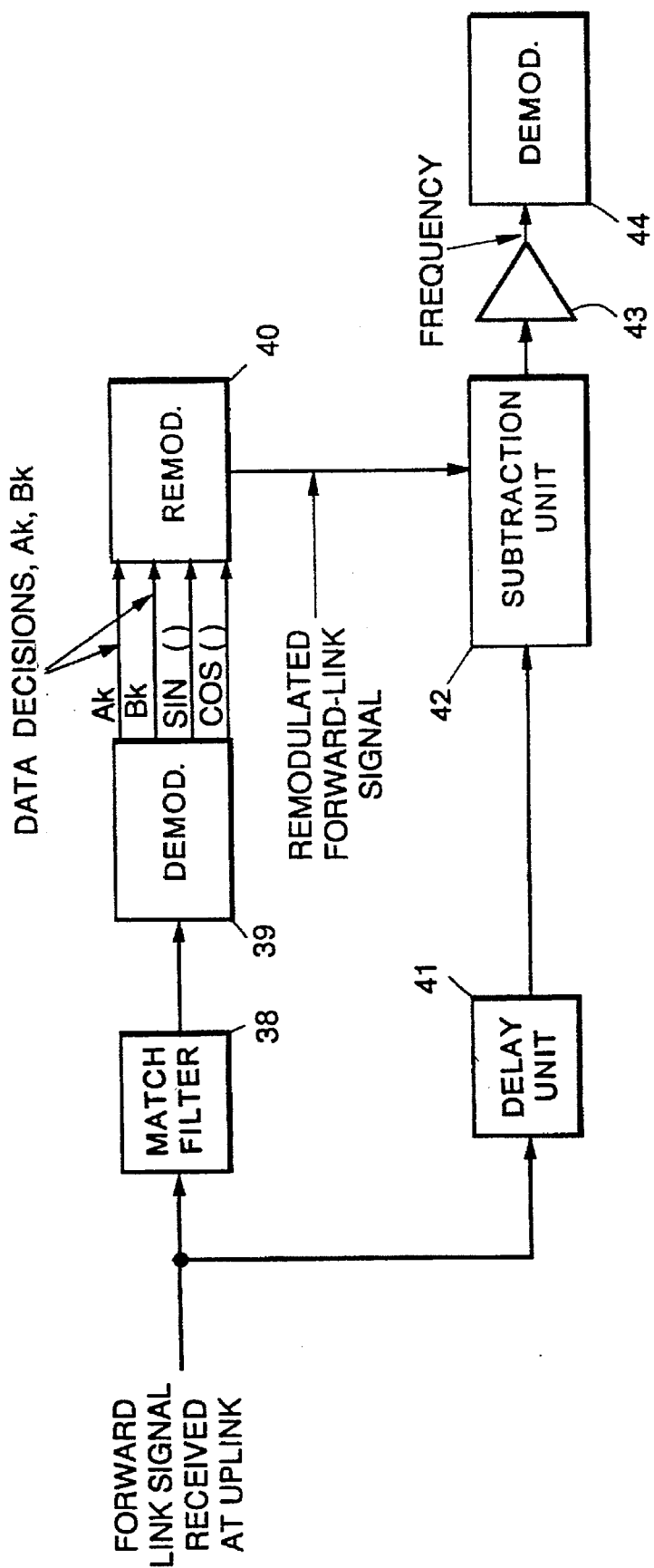
FIG. 3 is a block diagram of an apparatus according to the present invention using analog techniques.

Referring now specifically to FIG. 3, a block diagram of an apparatus, hereinbelow referred to as a canoeist, for implementing the above-mentioned concept of the invention comprises modem input matched filter 38 connected to a signal parameter estimator and demodulator 39 which is a coherent QSPK demodulator. It provides data decisions, A$_K$ and B$_K$, as well as sine and cosine components of the forward-link signal intended to be remodulated. A remodulator 40 accomplishes regenerating of the forward-link signal 22 from the composite signal 28 containing a forward-link signal 22 constituent. Besides the regenerating being performed at the received carrier frequency, it uses also the same phase, clock timing, amplitude level and modulation as that of the signal 22. A version of the signal 28 received from the satellite 23 is delayed in a block 41 and an output of remodulator 40 are applied to a subtraction unit 42 where cancellation itself takes place. Amplified in an amplifier 43, the signals, after cancellation, are delivered to spread-spectrum demodulator 44.

With ideal cancellation, only the SS signals would remain with thermal noise. Under real conditions, the residual up-link signal can be reduced to a level that is comparable to the thermal noise, depending on the accuracy β of the cancellation. The noise is still larger than the SS signals, but, because the noise is much lower in power level than the forward-link signal, a significant reduction results in the interference level experienced by the SS signals. The net result is that the SS signals can now operate at a much higher data rate than would otherwise be possible. Increases of two orders of magnitude, from 100 bps to approximately 10 kbps, appear to be possible, depending upon the accuracy with which the cancellation takes place.

To explain in further detail, and by way of an example, after the cancellation has been accomplished with an accuracy β such that the "power" in the forward-link signal is reduced from $P_F$ at the input to the canoelet to β$P_F$ at its output (β=0 is perfect cancellation, β=1 is no cancellation), the spectral density of the forward-link signal is reduced to $I'_o$=β$P_F$/$R_S$. The ratio of energy per spread-spectrum information bit to total noise density is $$\frac{E_b}{(N_o + I'_o)} = \frac{FP_{ss} \frac{1}{R_b}}{(N_o)_T + \frac{\beta P_F}{R_s}} \geqq \left(\frac{E_b}{N_o}\right)_{REQ} \quad (3)$$

or, to rearrange this equation to give bit rate R$_b$ versus canceler accuracy, β, for (E$_b$N$_o$)REQ=4.2 dB as $$R_b = \frac{1}{\left(\frac{E_b}{N_o}\right)_{REQ}} \left(\frac{(N_o)_T}{FP_{ss}} + \frac{\beta P_F}{(FP_{ss}R_s)}\right)^{-1} \quad (4)$$

After substituting FP$_{ss}$/(N$_o$)$_T$=46.7 dB, P$_F$/FP$_{ss}$=48.8 dB, (E$_b$/N$_o$)$_{REQ}$=4.2 dB, and R$_s$=73 dB (20 MHz), $$R_b = 0.380 \; (2.14 \times 10^{-5} + 3.8 \times 10^{-3} \; \beta)^{-1} \; bps \quad (5)$$

Figure 4:
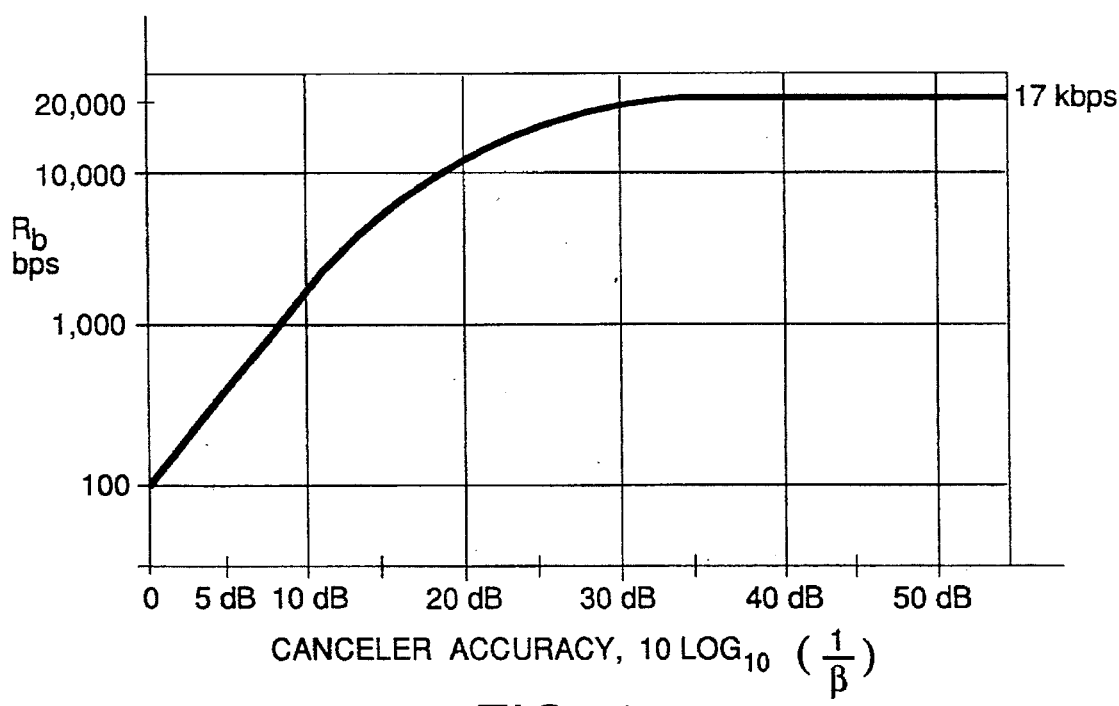
FIG. 4 is a diagram of achievable information bit rate for one VSAT versus canceler accuracy.

Achievable bit rate versus canceler accuracy 10 log$_{10}$(1/β) is given in FIG. 4. It applies to a single spread-spectrum signal in thermal noise and a large interfering signal. In the actual application, a number of spread-spectrum signals can be transmitted from an equal number of remote VSATs 24.

The parameters mentioned above are assumed for hub station's, 21, EIRP, VSAT's, 24, EIRP, and the satellite's, 23, characteristics. The restriction on the number N of spread-spectrum carriers will be determined in order to limit degradation of the forward-link signal 22 to a particular value such as a fraction of a dB.

The input to the satellite 23 consists of the uplink signal S$_F$, thermal noise N$_u$, and N spread-spectrum signals, each with power Sss. On the downlink, the desired forward-link signal receives a fraction of the satellite's EIRP $$\eta = \frac{S_F}{S_F + N_u + NS_{ss}} = \frac{1}{1 + \frac{N_o B_T}{S_F} + \frac{NS_{ss}}{S_F}}$$

From the link budget parameters, $S_F/(N_o B_T)$ is 26.4 dB and $S_F/S_{ss}$ is 45.8 dB. The "power sharing" loss is therefore $$\eta = (1 + 2.29 \times 10^{-3} + 2.63 \times 10^{-5} N)^{-1}$$

On the downlink 26, the forward-link carrier is received at the remote VSAT 24 with a carrier power to noise density ratio $$\left(\frac{C}{N_o}\right)_T = \frac{\eta C_F}{(N_o)_{DN} + (N_o)_{UP} + \frac{1}{B_T} NC_{ss}}$$

where $C_F$ is the level of the forward-link carrier at VSAT 24
$C_{ss}$ is the level of one spread-spectrum carrier at VSAT 24
$B_T$ is the bandwidth of the spreading (24 MHz)
Dividing through by $C_F$ gives $$\left(\frac{C}{N_o}\right)_T = \eta \left( \left(\frac{C_F}{N_o}\right)_{DN}^{-1} + \left(\frac{C_F}{N_o}\right)_U^{-1} + \frac{N}{B_T} \frac{C_{ss}}{C_F} \right)^{-1}$$

Figure 5:
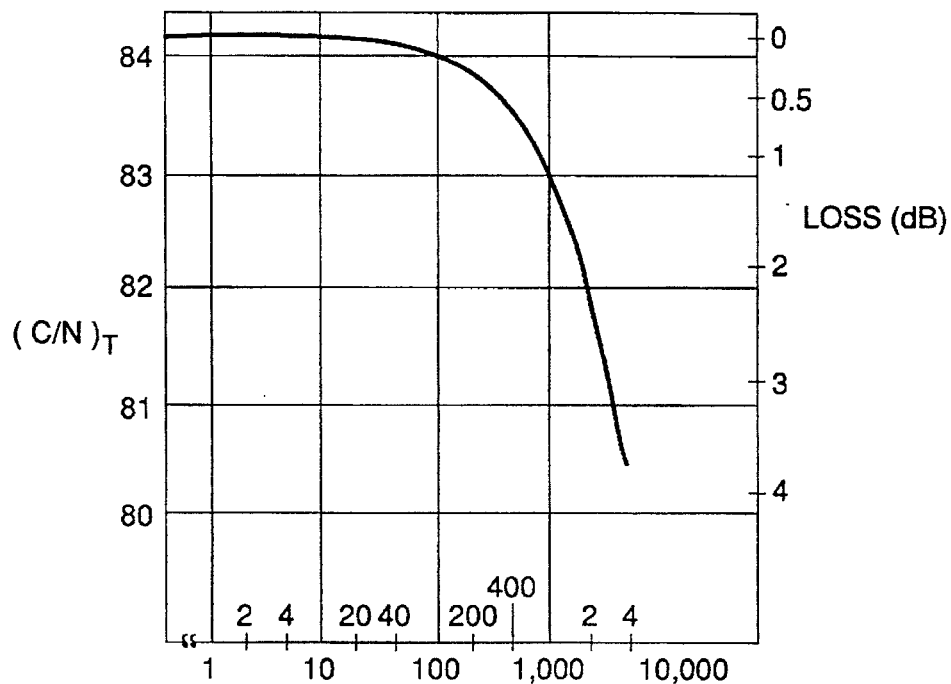
FIG. 5 is a diagram showing degradation of the forward-link signal depending on the number of VSATs.

After substitution $$\left(\frac{C_F}{N_o}\right)_U = 100.2 \text{ dB}, \left(\frac{C_F}{N_o}\right)_D = 84.3 \text{ dB}, \frac{C_F}{C_{ss}} = 45.8 \text{ dB}$$

the result is $$\left(\frac{C}{N_o}\right)_T = \eta \, (3.72 \times 10^{-9} + 9.55 \times 10^{-11} +$$

$$1.10 \times 10^{-12} N)^{-1} = (1.00229 +$$

$$2.63 \times 10^{-5} N)^{-1} (3.815 \times 10^{-9} + 1.10 \times 10^{-12} N)^{-1}$$

and when N=0, this gives $(C/N_o)_T = 84.2$ dB. The degradation in forward-link $(C/N_o)_T$ versus number of spread-spectrum transmitters with EIRP=33 dBW is shown in FIG. 5. If 0.5 dB loss in clear sky $(C/N_o)_T$ is allowed, then several hundred spread-spectrum signals can be allowed to occupy the transponder 25.

To determine the number of spread-spectrum signals, each of data rate $R_b$ bps, that can be supported in the return-link transponder, Equation (5) can be modified to include the self-interference $S_o$ as $$\frac{E_b}{N_o + I_o' + S_o} = \frac{FP_{ss} \frac{1}{R_b}}{(N_o)_T + \frac{\beta P_F}{R_s} + \frac{1}{B_T}(N-1)P_{ss}} \geq \left(\frac{E_b}{N_o}\right)_{REQ} \quad (6)$$

where

F—the rain fade of one SS signal
$P_{ss}$—the power received at the hub station 21 in one SS signal
$R_b$—the information bit rate of each SS signal
$(N_o)_T$—the thermal noise density, total in the receiver
$\beta$—the fraction of the 30-Mbps signal that appears at the output of the canceler
$P_F$—the received power in the forward-link signal 22
$R_s$—the QPSK symbol rate $(20 \times 10^6)$
$B_T$—the transponder 25 bandwidth
N—the number of spread-spectrum signals
Equation (6) can be simplified to give $$\frac{E_b}{N_o + I_o' + S_o} = \frac{\frac{F}{R_b}}{\frac{N_o}{P_{ss}} + \frac{\beta P_F}{P_{ss} R_s} + \frac{(N-1)}{B_T}} \geq \left(\frac{E_b}{N_o}\right)_{REQ} \quad (7)$$

Substituting the constants $P_F/P_{ss}=45.8$ dB, $P_{ss}/(N_o)_T=49.7$ dB, $R_s 20 \times 10^6$, $B_T 24 \times 10^6$, F=0.5, and $(E_b/N_o)_{REQ}=4.2$ dB gives $$\frac{1}{R_b}(1.07 \times 10^{-5} + 1.9 \times 10^{-3}\beta + (N-1)4.17 \times 10^{-8})^{-1} \geq 5.25 \quad (8)$$

This relationship gives the number of spread-spectrum users that can transmit a data rate $R_b$ as a function of canceler accuracy $\beta$. Rearranging (8) gives $$R_b \leq (5.596 \times 10^{-5} + 9.975 \times 10^{-3}\beta + 2.189 \times 10^{-7} N)^{-1} \text{ bits/sec} \quad (9)$$

Figure 6:
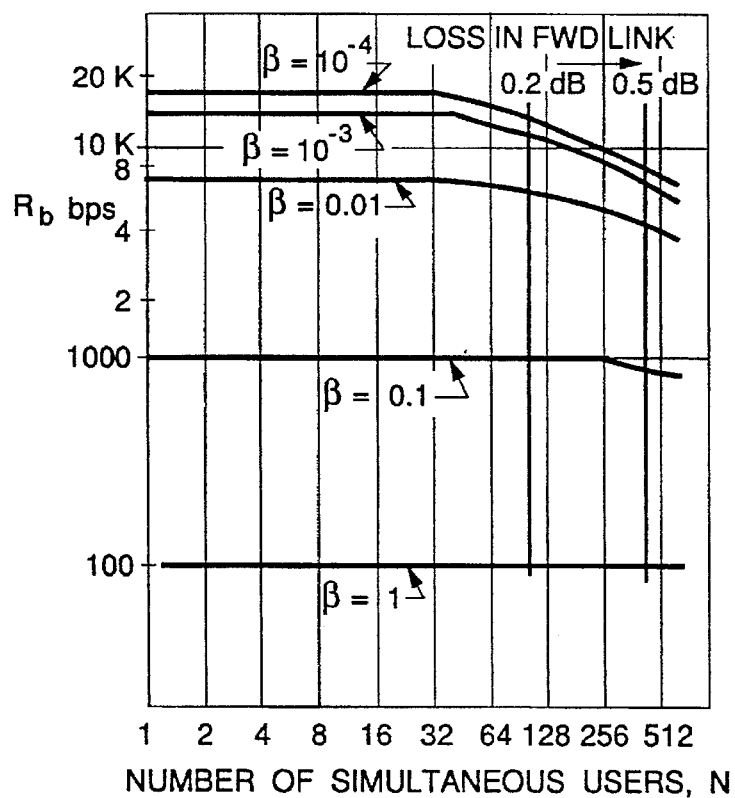
FIG. 6 is a diagram showing information bit rate for one VSAT versus number of VSATs, with canceler accuracy as a parameter.

Results are plotted in FIG. 6 where bit rate per user versus number of users, N, with canceler accuracy (effectiveness), $\beta$, as parameter is shown. With no cancellation ($\beta=1$), the bit rate is limited to 100 bps and the numbers of users is limited to several hundred if forward-link degradation is limited to several tenth of a dB. As the canceler is made more effective, the bit rate of each user increases, but the number of users remains at several hundred because of the constraint on allowable degradation to the forward link. With 20 dB of cancellation ($\beta=0.01$) bit rate per user is about 5 kbps in the region of 100 to 400 spread-spectrum users.

From the above, it may be appreciated that this cancellation method allows reasonable return-link data rates even though the spread-spectrum return-link signals are at very low levels compared to the forward-link signal as received back at the hub station.

Figure 7A:
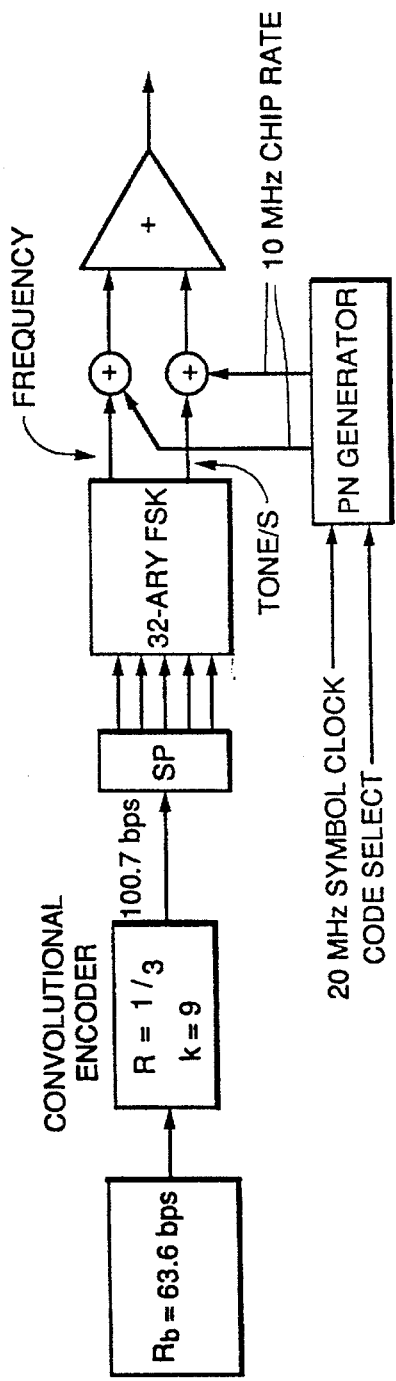
FIGS. 7a and 7b are block diagrams of digital transmission equipment useful in implementing the invention.
Figure 7B:
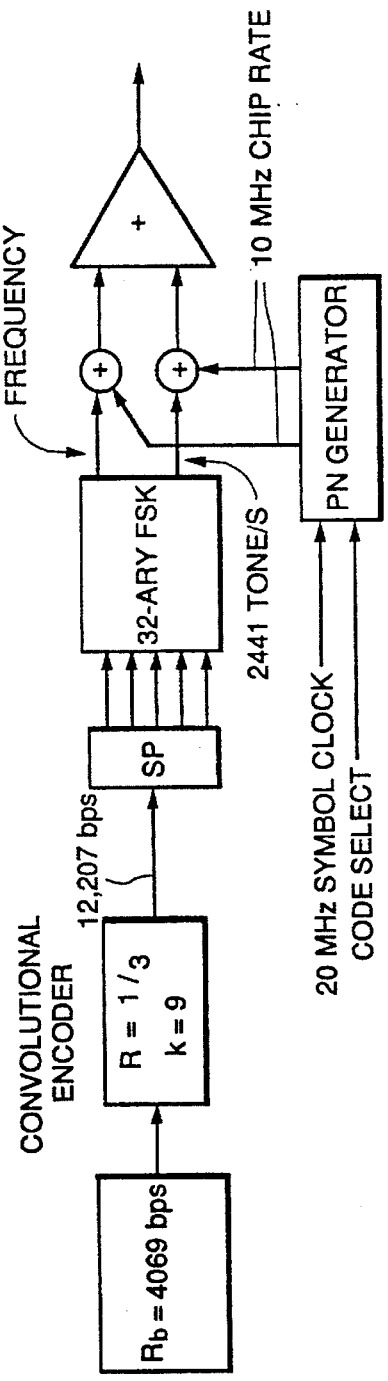
Figure 8A:
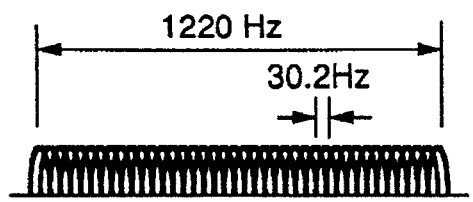
FIGS. 8a, 8b, 8c, and 8d are graphical representations of signals processed at and formed in the equipment shown in FIGS. 7a and 7b.
Figure 8B:
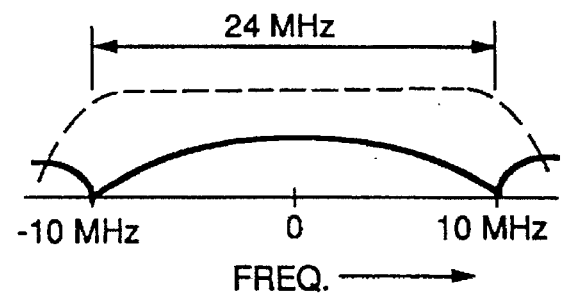
Figure 8C:
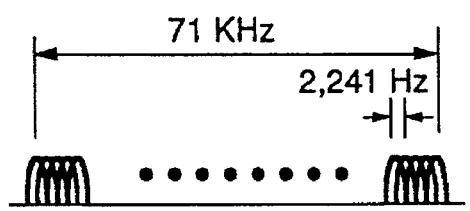
Figure 8D:
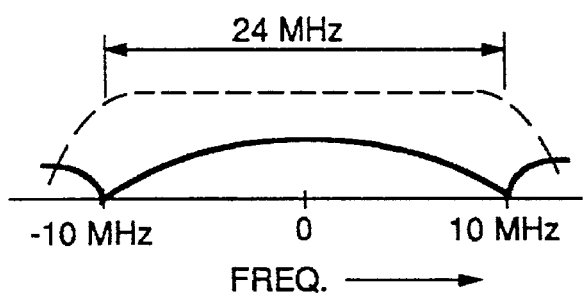

While FIG. 3 indicated an implementation of the canceler using analog techniques, FIGS. 7a and 7b show an alternative implementation that uses digital techniques, and FIGS. 8a, 8b, 8c, and 8d show signals being processed at and resulting from the canceler shown in FIGS. 7a and 7b. The spread-spectrum signals are assumed to be M-ary FSK with PN modulation to spread the transmission over the available bandwidth. An alternative would be to frequency hop (FH) over the same wide bandwidth, although the FH system might be more complex to implement. An apparatus according to FIGS. 7a and 7b may be used in two options. Both use R=⅓, K=9 convolutional encoding and 32-ary FSK. The first implementation operates at $R_b \leq 100$ bps that would be necessary if no cancellation were possible. The second is intended for operation at $R_b \leq 5$ kbps, which is possible if 20 dB of cancellation is achieved. For the first alternative, the PN chip rate is selected as ½ the forward-link symbol rate of 20 Msps so that $R_{chip} = 10 \times 10^6$ chips/second. It is desirable that there be exactly $N_c$ PN chips in each M-ary FSK tone and that this number be a power of two, thus $N_c = 2^2$. The relationship between information bit rate and tone rate $R_t$ is $$r_t \text{ tones/second} = \frac{R_b \text{ information bits/second}}{\text{CODE RATE} \times \log_2(M)}$$

Assuming a code length $N_c = 2^{18} = 262,144$ and that M=32, then the parameter values are determined as $$R_t = \frac{10^7 \text{ chips/second}}{262{,}144 \text{ chips/tone}} = 38.15 \text{ tones/second}$$

$$R_b = \frac{1}{3} \times 5 \times 38.15 = 63.58 \text{ information bits/second}$$

There are tradeoffs between code rate, R, and M to achieve $R_b$ near the desired value. The value chosen is less than the maximum value that the link will support and gives some extra margin.

For the higher data rate mode, values are selected that increase the data rate by a factor of approximately 64, which implies $N_c=4096$ and $$R_t = \frac{10^7 \text{ chips/second}}{4096} = 2441 \text{ tones/second}$$

$$R_b = \frac{1}{3} \times 5 \times 2441 \text{ tones/seconds} = 4069 \text{ bits/seond}$$

For the both transmission formats mentioned, it is assumed that N spread-spectrum signals exist in the transponder at one time along with the forward-link signal $S_F$. At the hub station 21, the forward-link signal is received and applied to a QPSK demodulator 39 that synchronizes to, and demodulates, the forward-link signal.

The demodulator matched filter 38 produces synchronized I and Q channel waveforms from which an eye diagram can be derived and samplers can extract samples from the most open part of the eye diagram. These samples may be quantized for soft decision demodulation/decoding, or the polarity of the samples (positive or negative) can be used to make hard decision. Prior to the decision-making process, the samples of the eye diagram are important to the processing that must follow to recover the spread-spectrum signals.

Figure 9:
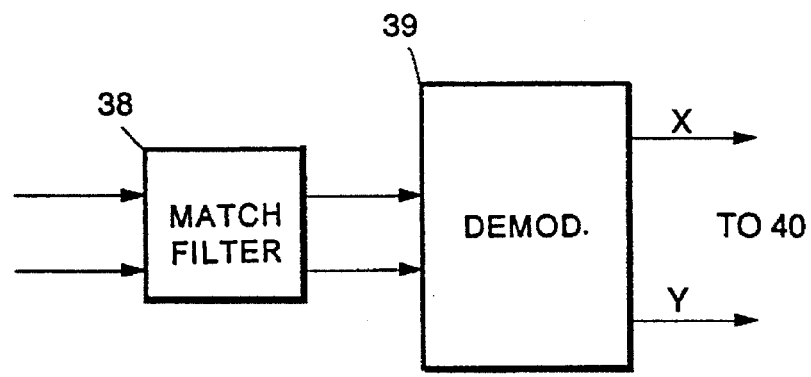
FIG. 9 shows separately the filter and modulator of the receiving equipment shown in FIG. 3, used for coherent demodulation in accordance with the present invention.
Figure 10A:
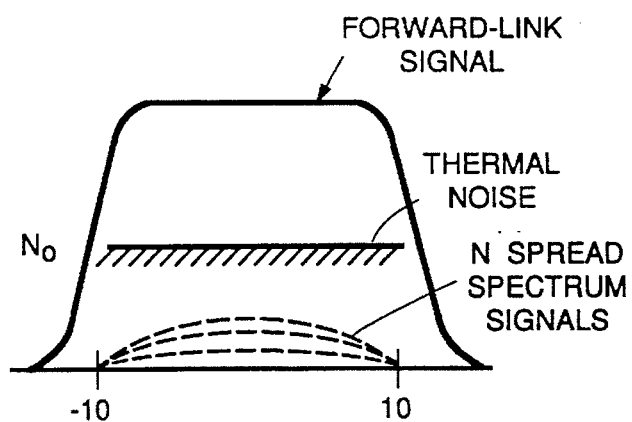
FIGS. 10a, 10b, and 10c show signals accompanying coherent demodulation of the forward-link signal and scatter diagrams in the decision plane.
Figure 10B:
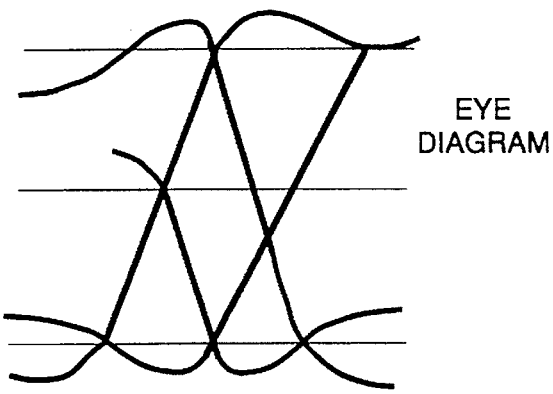
Figure 10C:
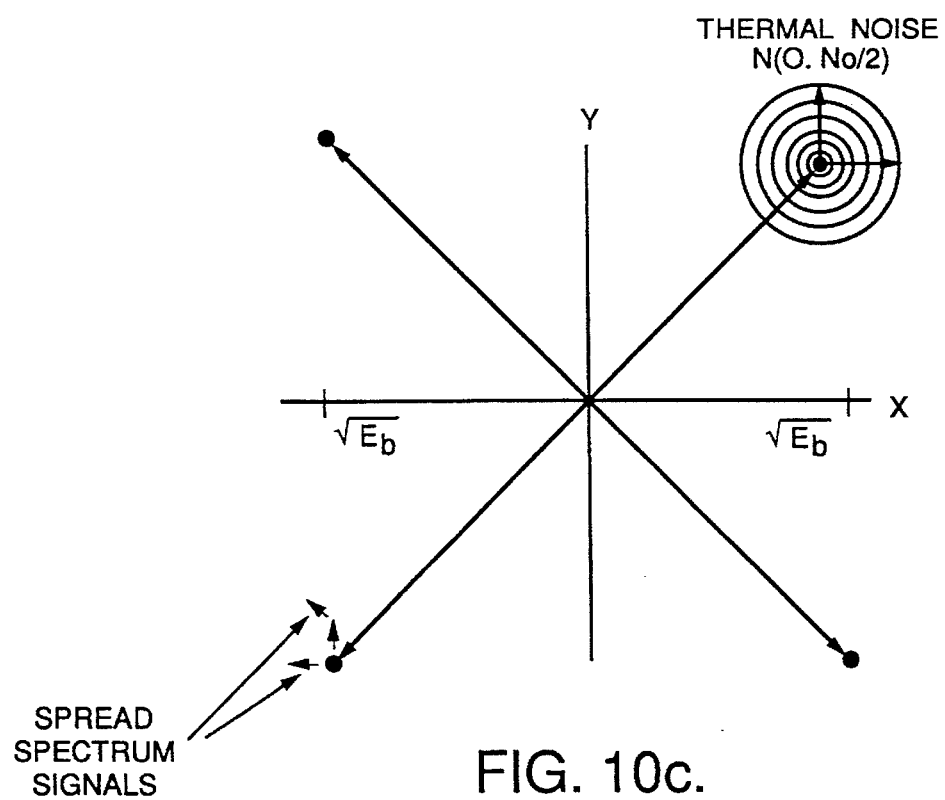

Considered jointly, FIGS. 9 and 10 show, conceptually, the formation of the decision region and the information contained therein. The output of the demodulator 39 can be thought of conceptually in terms of the scatter diagram shown in FIG. 10c while FIG. 10a depicts the signal at the input of the filter 38 of FIG. 9, and FIG. 10b is an eye diagram which can be derived from I and Q channel waveforms at the output of the filter 38. The QPSK demodulator 39 has estimated carrier phase and symbol timing to an accuracy such that samples can be taken of the eye diagram at the point of maximum eye opening where there is no intersymbol interference. The samples in the X and Y (I and Q) directions are symmetrical (oriented at 45°, 135°, 225°, and −45°) indicating no error in carrier phase estimation. Successive samples fluctuate randomly between quadrants because of the random modulation.

The X-Y scatter diagram in FIG. 10c contains three types of information:

1. The forward-link signal—This signal has been synchronized to, and demodulated to the extent that I/Q samples have been taken prior to decisions being made. The scatter points define vectors in the four quadrants that depend upon the random modulation. Vector length is proportional to the square root of the energy per symbol $$(E_b + E_b)^{1/2} \ne E_s^{1/2}$$

With perfect carrier recovery, these vectors will be oriented at a 45 degree angle in each of the four quadrants.

2. Thermal noise—The effect of thermal noise at the input to the demodulator appears as samples $\eta_x$, $\eta_y$ of the noise that appears as Gaussian random variables with mean=0 and standard deviation $$\sigma_x = \sigma_y = \sqrt{\frac{N_o}{2}}$$

where $N_o$ is the thermal noise spectral density in Watts/Hz. When the large hub station receives the uplink signal, $E_b/N_o$ is very high so that the noise is at a relatively low level.

3. The N spread-spectrum signals—These signals appear as complex samples rotating about the large forward link signal vector at an offset frequency that depends on the tone generated by the M-ary FSK and any offset between the forward-link carrier and the spread-spectrum carrier. Furthermore, the individual carriers are multiplied by the PN chips that constitute the unique code for that signal. In this application, the individual spread-spectrum signals are almost 50 dB below the forward-link signal. If the forward-link signal produces a vector of length 1 Volt in the decision region, each spread-spectrum signal produces a vector of length $V_s$=0.00316 volts. Extreme accuracy must be maintained to correlate and recover these small spread-spectrum signals in the presence of the large forward-link signal vector.

For example, if the decision space is to be sampled and A/D converted over the range $$\pm \sqrt{E_b} + 2\sqrt{\frac{N_o}{2}}$$

to maintain reasonable linearity, the A/D converter would have to cover the range $$\pm 1 \pm 2\sqrt{\frac{N_o}{(2E_b)}}$$

If four quantization levels are maintained on the spread-spectrum signals, then the number of levels in the A/D convert is $$\text{number of levels} = \frac{2\left(1 \pm 2\sqrt{\frac{N_o}{2E_b}}\right)}{1/4 \cdot 0.00316}$$

For $E_b/N_o$=24.6 dB, 2,741 levels are required, which requires a 12-bit A/D converter ($2^{12}$=4,096 levels) if the samples of the eye diagram were obtained directly without cancellation. Use of the canceler, in effect, removes the constant "1" in the numerator of the above expression, thus requiring the A/D converter to span only the range $$\pm 2\sqrt{\frac{N_o}{2E_b}}$$

so that if four quantizing cells are maintained on the spread-spectrum signals, the number of levels in the A/D converter can be reduced to $$\text{number of levels} = \frac{2 \cdot 2\sqrt{\frac{N_o}{2E_b}}}{1/4 \cdot 0.00316}$$

Again for $E_b/N_o$=24.6 dB, this gives 210.8 so that an 8-bit A/D converter (256 levels) should now be sufficient. For sampling operation at $20 \times 10^6$ complex samples/second, this is a more practical value.

Figure 11A:
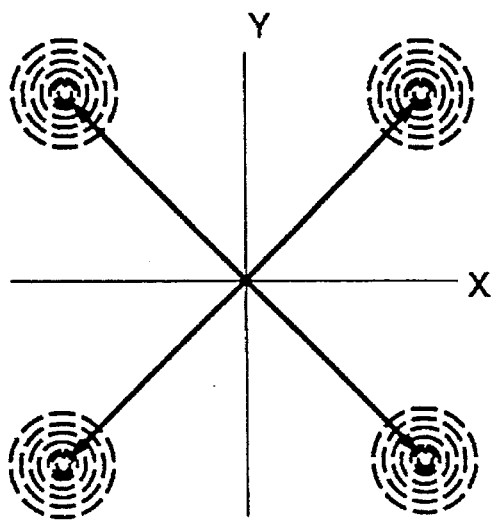
FIGS. 11a, 11b, and 11c show diagrams illustrating cancellation of the forward-link signal according to the present invention, using digital techniques.
Figure 11B:
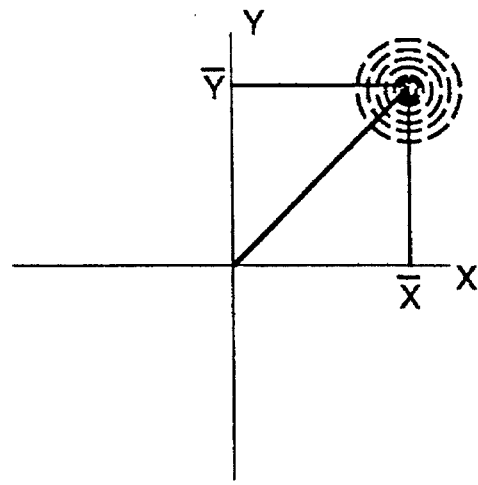
Figure 11C:
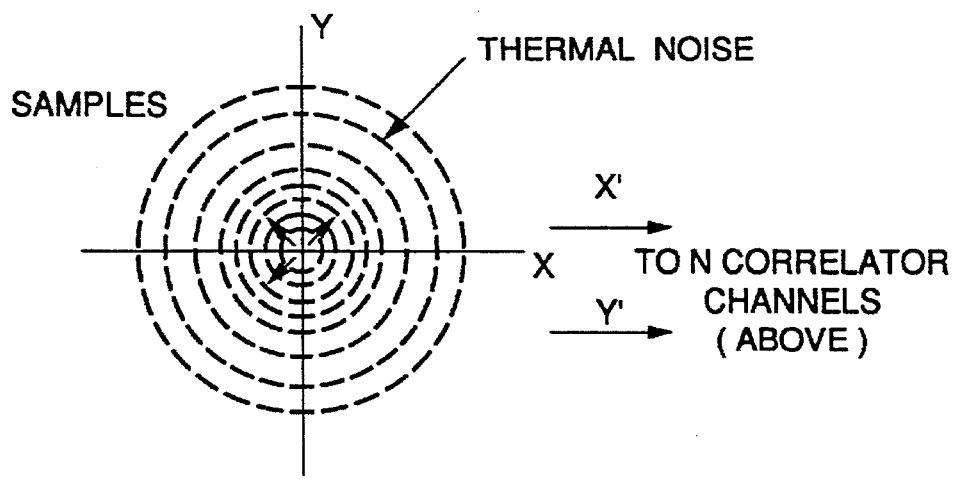

The presence of the large forward-link signal vector makes the recovery of the spread-spectrum signals very difficult. If the presence of this signal could be removed, the correlation operation would be much easier in the sense that less processing gain would be needed. The removal or cancellation involves three steps as shown in FIGS. 11a, b, and c respectively:

1. On each sample in the decision region, a decision is made on the quadrant and all samples are mapped into the first quadrant. Hard decisions are thereby made on the forward-link modulation and this modulation is removed. Because $E_b/N_o$ is so large (i.e., 24.6 dB), this can be done with negligible errors.

2. With all scatter points mapped into the first quadrant, estimates are made of the mean values in the X and Y directions, $\overline{X}$ and $\overline{Y}$.

3. The estimated means, $\overline{X}$ and $\overline{Y}$, are removed from each sample point, which, in effect, moves the scatter diagram to the origin and removes the effect of (i.e., cancels) the forward-link signal.

The remainder X and Y signal samples at the origin can be amplified for additional processing. The cancellation will not be perfect, but the effect of the forward-link signal can be greatly attenuated. With perfect cancellation, the samples of the spread-spectrum signals remain buried under the thermal noise. Imperfect cancellation would result from errors in estimating symbol epoch, carrier phase, or signal amplitude (i.e., $\overline{X}$ and $\overline{Y}$). In practice, it should be easy to achieve 15 to 25 dB of cancellation. Higher levels such as 30 to 40 dB would be difficult but, as appears from FIG. 4, are not necessary.

Figure 12:
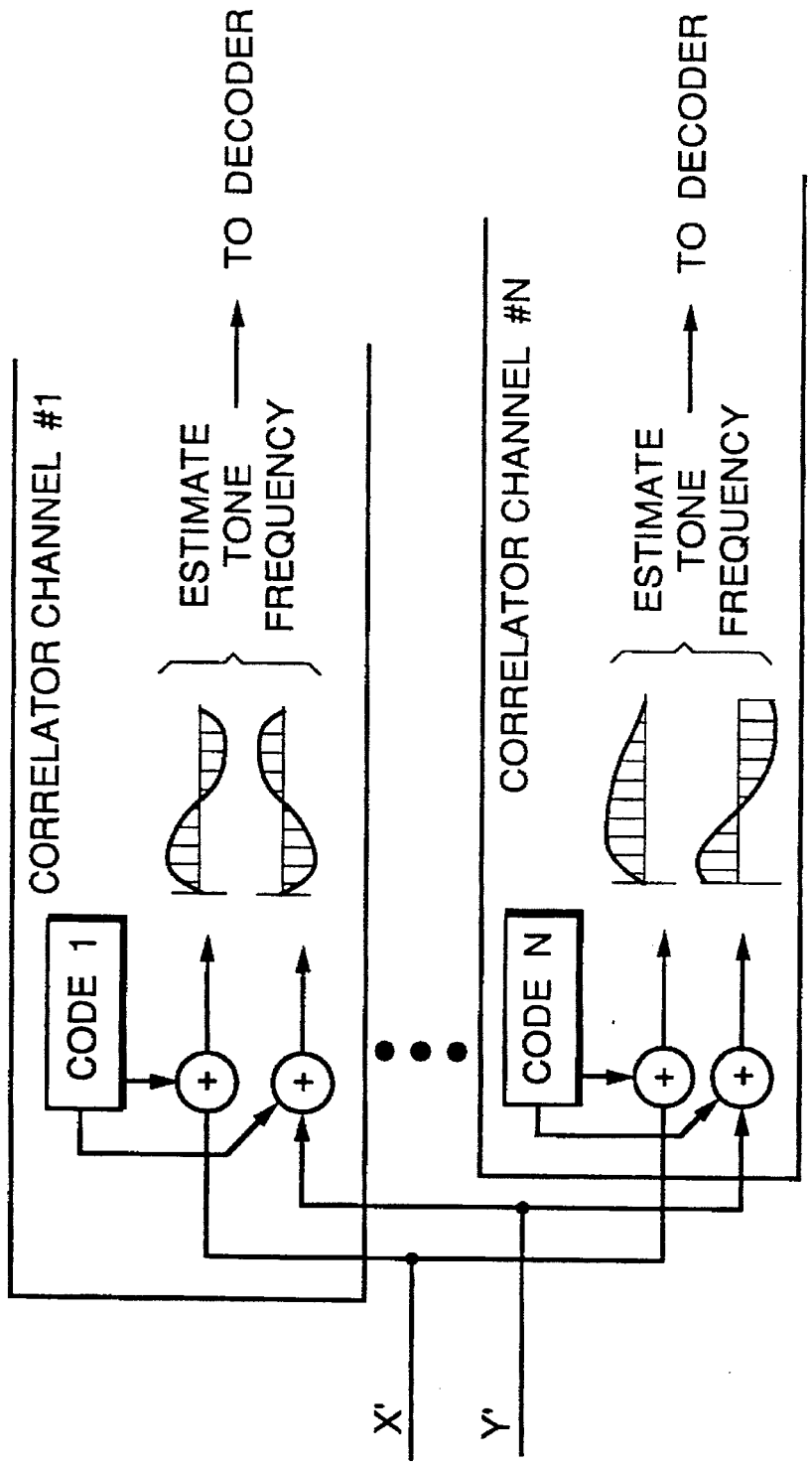
FIG. 12 shows an arrangement used for correlation and SS demodulation following the cancellation illustrated by diagrams of FIGS. 11a, 11b and 11c.

In order to recover the individual M-ary FSK signals, the signal samples in FIG. 10 must be put into N correlator channels shown in FIG. 12. In FIG. 10a, the presence of the random modulation, which makes the forward-link signal equally likely to map into one of the four quadrants, makes it necessary to correlate over a large number of chips, each independently perturbed by a large signal vector, before a positive output is obtained from the correlator. With the forward-link signal removed, as shown in FIG. 10c, the correlator channels do not need as much processing gain (chips per tone) to recover the signal. This reduction in the necessary processing gain (number of chips per tone) allows the tone rate to be increased, which results in a large increase in the information bit rate.

If frequency hopping were used for spreading instead of direct sequence pseudonoise, N dehopping operations would be performed at the output of the canceler. The dehopping would use N digital synthesizers to heterodyne the wideband hopping (±10 MHz) out of the canceler to the date basebands covered by the 32-ary FSK. Decisions would then be made on the tone that was transmitted in each of the N channels.

For either direct sequence PN or FH, the important point is that large signal cancellation takes place before the N correlation channels. Because of the random modulation, this large signal inserts a bias into the correlators. A large processing gain is needed to overcome (or randomize) this bias; hence, data rate is limited unless cancellation is performed.

While our invention has been described in conjunction with specific embodiments, it is evident that many alternatives, modifications and variations by mere substitutions or changes in blocks and sequence of steps, will be apparent to those skilled in the art in light of the foregoing description. Accordingly, it is intended to embrace all such alternatives, modifications and variations as may fall within the spirit and broad scope of the claims which are appended hereto.

What is claimed is:

1. An apparatus for return-link signal transmission in direct broadcasting satellite networks having a hub earth station and a plurality of remote terminal earth stations communicating with said hub station via a satellite, said hub station transmitting forward-link signals to said remote terminal stations, and said remote terminal stations transmitting return-link signals to said hub station, comprising:

means at said hub station for receiving from said satellite composite signals containing said forward-link signals interfered with said return-link signals and for regenerating said received forward-link signals from said composite signals; and means for subtracting said regenerated forward-link signals from said composite signals, thereby enabling said return-link signals from said remote terminal stations to operate at a higher data rate.

2. The apparatus for return-link signal transmission recited in claim 1, wherein said regenerating means uses the same phase, clock timing, amplitude level and modulation as those in said forward-link signals.

3. A method of return-link signal transmission in direct broadcasting satellite networks of the type having a hub earth station communicating via a satellite with a plurality of remote terminal earth stations, said hub station transmitting forward-link signals to said satellite, said satellite retransmitting said forward-link signals to said plurality of said remote terminal stations, and said remote terminal stations transmitting return-link signals to said satellite, said satellite retransmitting said return-link signals interfered with said forward-link signals to said hub station, comprising the steps of:

synchronizing said return-link signals with said forward-link signals at said remote terminal stations;

synchronizing said return-link signals with said forward-link signals at said satellite;

receiving composite signal having said forward-link signals interfered with said return-link signals at said hub station; and, canceling at said hub station said received forward-link signals in said composite signals, thereby enabling said return-link signals from said remote terminal stations to operate at a higher data rate.

4. The method of return-link signal transmission recited in claim 3, wherein said step of canceling said forward-link signals in said composite signals includes:

delaying at said hub station of said composite signals received from said satellite;

regenerating said received forward-link signals at said hub station; and subtracting said regenerated forward-link signals from said composite signals delayed at said hub station.

5. The method of return-link signal transmission recited in claim 4, wherein the phase, clock timing, amplitude level, and modulation with which said regenerating of said forward-link signals is accomplished are selected to be the same as those of said forward-link signals.

6. The method of return-link signal transmission recited in claim 3, wherein said return link signals transmitted from said remote terminal stations are spread-spectrum modulated.

7. The method of return-link signal transmission recited in claim 6, wherein said spread-spectrum modulated return-link signals are FSK with pseudonoise modulation.

8. The method of return-link signal transmission recited in claim 6, wherein said spread-spectrum modulated return-link signals are FSK with frequency hopping.

9. The method of return-link signal transmission recited in claim 3, wherein said step of synchronizing said return-link signals with said forward-link signals at said remote terminal stations includes deriving return-link transmitter pseudo noise chip rates from forward-link QPSK symbols received at said remote terminal stations.

10. A method of return-link signal transmission in direct broadcasting satellite networks of the type having a hub earth station, a satellite, and a plurality of remote terminal earth stations, said hub station transmitting forward-link signals to said plurality of said remote terminal stations via said satellite, and said remote terminal stations transmitting return-link signals via said satellite to said hub station, comprising the steps of:

synchronizing said return-link signals with said forward-link signals at said remote terminal stations;

synchronizing said return-link signals with said forward-link signals at said satellite;

receiving composite signals having said forward-link signals interfered with said return-link signals at said hub station;

delaying said composite signals received at said hub station from said satellite;

regenerating said received forward-link signals at said hub station; and, subtracting said regenerated forward-link signals from said delayed composite signals, thereby enabling said return-link signals from said remote terminal stations to operate at a higher data rate.

11. The method of return-link signal transmission recited in claim 10, wherein the phase, clock timing, amplitude level, and modulation with which said regenerating of said received forward-link signals is accomplished are selected to be the same as those of said forward-link signal.

12. The method of return-link signal transmission recited in claim 10, wherein said return-link signals transmitted from said remote terminal stations are spread-spectrum modulated.

13. The method of return-link signal transmission recited in claim 12, wherein said spread-spectrum modulated return-link signals are FSK with pseudonoise modulation.

14. The method of return-link signal transmission recited in claim 10, wherein said spread-spectrum modulated return-link signals are FSK with frequency hopping.

15. The method of return-link signal transmission recited in claim 10, wherein said step of synchronizing said return-link signals with said forward-link signals at said remote terminal stations includes deriving return-link transmitter pseudo noise chip rates from forward-link QPSK symbols received at said remote terminal stations.

* * * * *